(12) United States Patent
He et al.

(10) Patent No.: US 11,486,384 B2
(45) Date of Patent: Nov. 1, 2022

(54) COMPRESSOR CONTROL METHOD, CONTROL APPARATUS AND CONTROL SYSTEM

(71) Applicant: Gree Electric Appliances, Inc. of Zhuhai, Guangdong (CN)

(72) Inventors: Xiaolin He, Guangdong (CN); Yang Li, Guangdong (CN); Wenbin Liu, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 5 days.

(21) Appl. No.: 17/261,277

(22) PCT Filed: Dec. 19, 2018

(86) PCT No.: PCT/CN2018/121896
§ 371 (c)(1),
(2) Date: Jan. 19, 2021

(87) PCT Pub. No.: WO2020/019642
PCT Pub. Date: Jan. 30, 2020

(65) Prior Publication Data
US 2021/0277885 A1    Sep. 9, 2021

(30) Foreign Application Priority Data

Jul. 23, 2018   (CN) .......................... 201810814213.6

(51) Int. Cl.
*F04B 49/00*    (2006.01)
*F04B 27/00*    (2006.01)
*F04B 49/06*    (2006.01)
*F04B 49/22*    (2006.01)
*F24F 11/86*    (2018.01)

(52) U.S. Cl.
CPC ............ *F04B 49/007* (2013.01); *F04B 27/00* (2013.01); *F04B 49/06* (2013.01); *F04B 49/22* (2013.01); *F24F 11/86* (2018.01)

(58) Field of Classification Search
CPC .......... F04B 27/00; F04B 49/06; F04B 49/22; F04B 49/007; F24F 11/86
See application file for complete search history.

(56) References Cited

U.S. PATENT DOCUMENTS 4,507,057 A * 3/1985 Igarashi ................ F04B 49/007
                                                                60/443
4,637,781 A * 1/1987 Akiyama ................ F04B 49/06
                                                                60/449

(Continued)

FOREIGN PATENT DOCUMENTS

CN    104654516 A    5/2015
CN    106500257 A    3/2017

(Continued)

Primary Examiner — Patrick Hamo
(74) Attorney, Agent, or Firm — The Webb Law Firm

(57) ABSTRACT

Disclosed are a compressor control method, control apparatus and control system. The method includes: receiving a cylinder switching instruction, and detecting operating parameters of a compressor; determining whether a cylinder switching operation is completed according to the operating parameters of the compressor; and after it is determined that the cylinder switching operation is completed, performing torque compensation.

17 Claims, 5 Drawing Sheets

(56) References Cited

U.S. PATENT DOCUMENTS

| | | | | | |
|---|---|---|---|---|---|
| 4,726,187 | A | * | 2/1988 | Reinhardt | F04B 49/08 |
| | | | | | 388/906 |
| 4,747,268 | A | * | 5/1988 | Reinhardt | F04B 49/06 |
| | | | | | 60/426 |
| 8,335,095 | B2 | * | 12/2012 | Mi | H02M 1/4225 |
| | | | | | 363/84 |
| 9,803,894 | B2 | * | 10/2017 | Lin | F25B 13/00 |

FOREIGN PATENT DOCUMENTS

| | | | |
|---|---|---|---|
| CN | 106500266 | A | 3/2017 |
| CN | 107289577 | A | 10/2017 |
| JP | 2000314564 | A | 11/2000 |
| JP | 2005337081 | A | 12/2005 |
| WO | 0066952 | A1 | 11/2000 |

* cited by examiner

)
COMPRESSOR CONTROL METHOD, CONTROL APPARATUS AND CONTROL SYSTEM

CROSS-REFERENCE TO RELATED APPLICATIONS

The present disclosure is a U.S. National Stage Application of International Patent Application No. PCT/CN2018/121896, filed on Dec. 19, 2018, which is based on and claims priority of China Patent Application No. 201810814213.6 titled "COMPRESSOR CONTROL METHOD, CONTROL APPARATUS AND CONTROL SYSTEM" filed on Jul. 23, 2018, the disclosures of both which are incorporated by reference herein in their entirety.

BACKGROUND

Field of the Invention

The present disclosure relates to the technical field of compressors, and specifically to a compressor control method, control apparatus and control system.

Description of Related Art

In order to improve the low-load energy efficiency of the inverter air conditioner and reduce the minimum cooling capacity, a compressor with a switchable cylinder may be configured to switch to different cylinders according to different load needs to improve the energy efficiency. However, the torque of the compressor itself does not remain the same before and after the cylinders vary. In order to reduce the vibration of the compressor, a torque compensation program needs to be added to the control of the compressor.

A related cylinder switching torque compensation control method is that: the master controller when detecting that a cylinder switching action is needed to perform currently, controls action of a corresponding solenoid valve, and at the same time sends an instruction of the switched cylinder to the drive controller, and the drive controller after receiving the instruction switches a torque compensation program.

However, since the time for action of the solenoid valve is much slower than that for receiving a command, it is possible that the drive controller has switched a corresponding compensation program, but a complete action of the solenoid valve has not been performed, so that switch of the cylinder has not been completed at this time, which is equivalent to adding a false torque compensation program to the compressor, thereby resulting in enhanced vibration of the whole machine during switching, reducing the service life of the pipeline, and reducing the reliability of the whole machine to certain extent. In severe cases, there are various protection shutdowns immediately, thus affecting the use of the unit.

Regarding the problem that the torque compensation of the compressor does not match the actually operating cylinder in the related art, there is no effective solution that has been set forth at present.

SUMMARY OF THE INVENTION

The present disclosure provides a compressor control method, control apparatus, and control system to at least solve the problem that the torque compensation of the compressor does not match the actually operating cylinder in the related art.

In order to solve the above-described technical problem, according to one aspect of the embodiments of the present disclosure, a compressor control method is provided comprising: receiving a cylinder switching instruction and detecting operating parameters of a compressor; determining whether a cylinder switching operation is completed according to the operating parameters of the compressor; and performing torque compensation after determining that the cylinder switching operation is completed.

In some embodiments, the method further comprises: detecting a current need for operating conditions before receiving the cylinder switching instruction, and determining whether the current need for operating conditions satisfies a cylinder switching condition; and generating the cylinder switching instruction when the current need for operating conditions satisfies the cylinder switching condition, wherein the cylinder switching instruction is configured to control action of a solenoid valve to perform the cylinder switching operation.

In some embodiments, detecting operating parameters of the compressor comprises: detecting a current operating parameter of the compressor when receiving the cylinder switching instruction; and detecting a real-time operating parameter of the compressor every first preset time interval.

In some embodiments, determining whether the cylinder switching operation is completed according to the operating parameters of the compressor comprises: calculating a ratio of the real-time operating parameter to the current operating parameter; comparing the ratio with a cylinder switching threshold, wherein the cylinder switching threshold is a preset value configured to represent that the cylinder switching is completed; and determining that the cylinder switching operation is completed when the ratio is greater than or equal to the cylinder switching threshold.

In some embodiments, the method further comprises: starting a timer to start timing after detecting the current operating parameter of the compressor; and stopping timing and clearing the timer after determining that the cylinder switching operation is completed.

In some embodiments, the method further comprises: detecting timing time after starting the timer, and determining whether the timing time reaches a cylinder switching waiting time, wherein the cylinder switching waiting time is a preset longest waiting time; and prompting that the cylinder switching operation fails and the solenoid valve or the compressor is malfunctioned when the timing time reaches the cylinder switching waiting time.

In some embodiments, the operating parameters of the compressor comprise at least one of operating power of the compressor, operating voltage of the compressor, or operating current of the compressor.

According to another aspect of the embodiments of the present disclosure, a compressor control apparatus is provided comprising: a detecting module configured to receive a cylinder switching instruction and detect operating parameters of a compressor; a determining module configured to determine whether a cylinder switching operation is completed according to the operating parameters of the compressor; and a compensation module configured to perform torque compensation after determining that the cylinder switching operation is completed.

In some embodiments, the apparatus further comprises: a switching determining module configured to a current need for operating conditions before receiving the cylinder switching instruction, and determine whether the current need for operating conditions satisfies a cylinder switching condition; and an instruction generating module configured to generate the cylinder switching instruction when the current need for operating conditions satisfies the cylinder switching condition, wherein the cylinder switching instruction is configured to control action of a solenoid valve to perform the cylinder switching operation.

In some embodiments, the detecting module comprises: a first detecting unit configured to detect a current operating parameter of the compressor when receiving the cylinder switching instruction; and a second detecting unit configured to detect a real-time operating parameter of the compressor every first preset time interval; the determining module comprises: a calculating unit configured to calculate a ratio of the real-time operating parameter to the current operating parameter; a comparing unit configured to compare the ratio with a cylinder switching threshold, wherein the cylinder switching threshold is a preset value configured to represent that the cylinder switching is completed; and a determining unit configured to determine that the cylinder switching operation is completed when the ratio is greater than or equal to the cylinder switching threshold.

In some embodiments, the operating parameters of the compressor comprise at least one of operating power of the compressor, operating voltage of the compressor, or operating current of the compressor.

According to a further aspect of the embodiments of the present disclosure, a compressor control system is provided comprising: a solenoid valve configured to perform a cylinder switching operation after receiving a cylinder switching instruction; a drive controller configured to detect operating parameters of a compressor after receiving the cylinder switching instruction, determine whether the cylinder switching operation is completed according to the operating parameters of the compressor, and perform torque compensation after determining that the cylinder switching operation is completed; and a master controller configured to send the cylinder switching instruction to the solenoid valve and the drive controller.

In some embodiments, the master controller is configured to determine whether a current need for operating conditions satisfies a cylinder switching condition by detecting the current need for operating conditions, and send the cylinder switching instruction to the solenoid valve and the drive controller when the current need for operating conditions satisfies the cylinder switching condition.

In some embodiments, the operating parameters of the compressor detected by the drive controller comprise at least one of operating power of the compressor, operating voltage of the compressor, or operating current of the compressor.

In some embodiments, the drive controller is configured to load a torque compensation program and execute the torque compensation program to perform torque compensation.

In some embodiments, the system further comprises: a timer configured to start timing after the solenoid valve receives the cylinder switching instruction; and stop timing and clear after the drive controller determines that the cylinder switching operation is completed.

In some embodiments, the master controller is further configured to detect timing time after the timer starts timing and determine whether the timing time reaches a cylinder switching waiting time, wherein the cylinder switching waiting time is a preset longest waiting time.

In some embodiments, the system further comprises: an alarm configured to prompt that the cylinder switching operation fails and the solenoid valve or the compressor is malfunctioned when the timing time reaches the cylinder switching waiting time.

In the present disclosure, in order to solve the problem that the torque compensation of the compressor does not match the actually operating cylinder, a torque compensation method of a compressor is provided, which comprises: receiving a cylinder switching instruction and detecting operating parameters of a compressor; determining whether a cylinder switching operation is completed according to the operating parameters of the compressor; and performing torque compensation after determining that the cylinder switching operation is completed. In this method, variation of the cylinder is detected in real time after receiving the cylinder switching instruction, and a corresponding torque compensation program is added after the compressor switches the cylinder, thereby reducing the vibration caused by the problem that the torque compensation of the compressor does not match the actually operating cylinder when the cylinder is switched, and improving the reliability of the whole machine.

BRIEF DESCRIPTION OF THE DRAWINGS

In order to more explicitly explain the embodiments of the present disclosure or the technical solutions in the related art, a brief introduction will be given below for the accompanying drawings required to be used in the description of the embodiments or the related art. It is obvious that, the accompanying drawings illustrated below are merely embodiments of the present disclosure. For those skilled in the art, it is also possible to obtain other drawings according to the accompanying drawings disclosed on the premise that no inventive effort is involved.

DETAILED DESCRIPTION OF THE INVENTION

Exemplary embodiments will be described in detail here, examples of which are illustrated in the accompanying drawings. When the following description relates to the accompanying drawings, the same numerals in different accompanying drawings represent the same or similar elements unless otherwise indicated. The implementations described in the following exemplary embodiments do not represent all the implementations consistent with the present disclosure. By contrary, they are merely examples of devices and methods consistent with some aspects of the present disclosure, as detailed in the appended claims.

Embodiment 1

Figure 1:
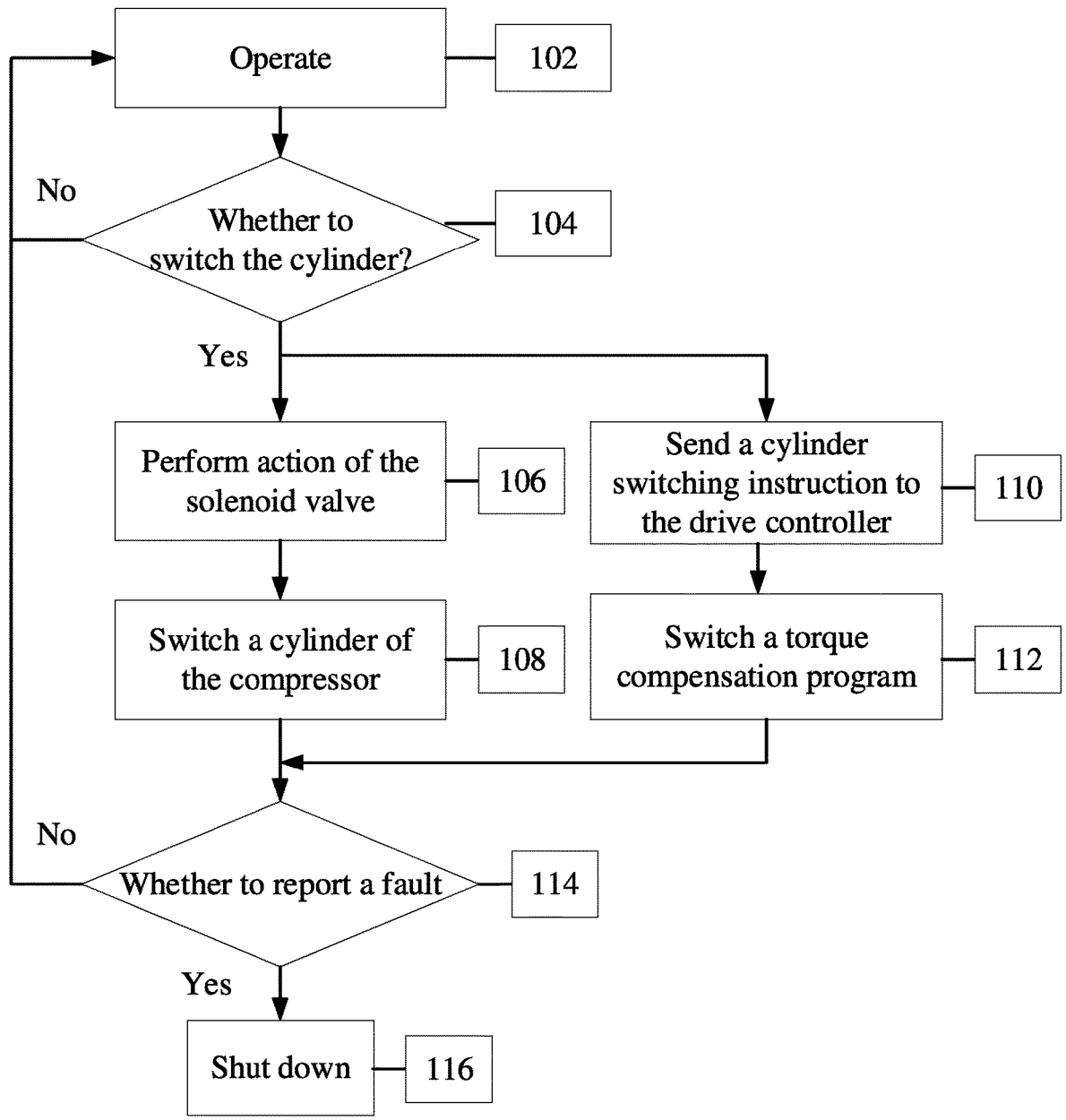
FIG. 1 is an alternative flowchart according to the compressor control method in the related art.
Figure 2:
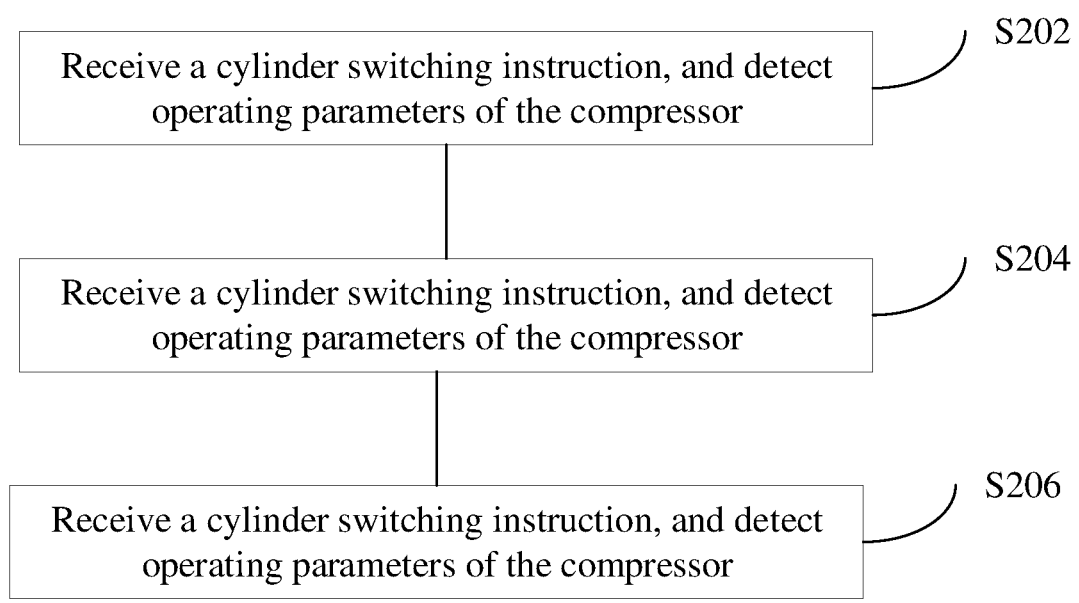
FIG. 2 is an alternative flowchart of the compressor control method according to Embodiment 1 of the present disclosure.

In the related art, when the compressor receives a master control command to switch the cylinder, action of the solenoid valve is controlled to switch the cylinder, and at the same time a corresponding torque compensation program is performed immediately. Specifically, FIG. 1 shows an alternative flowchart of this method. As shown in FIG. 1, the method comprises the following steps S102-S116.

In S102: the compressor is operated.

In S104: It is determined whether there is a need to switch the cylinder; if there is no need to switch the cylinder, return to step S102; if there is a need to switch the cylinder, perform steps S106 and S110 at the same time.

In S106: action of the solenoid valve is performed.

In S108: the cylinder of the compressor is switched and proceed to step S114.

In S110: a cylinder switching instruction is sent to the drive controller.

In S112: a torque compensation program is switched.

In S114: it is determined whether to report a fault; if it is determined to report a fault, proceed to step S116, and if it is determined not to report a fault, proceed to step S102.

In S116: Shut down.

In the above-described method, when there is a need to switch the cylinder, the solenoid valve and the drive controller act at the same time. Since the action of the solenoid valve is slower than the execution of the instruction, it is possible that there is such a circumstance that the compensation program has been switched, but the cylinder has not been switched, thereby resulting in enhanced vibration of the whole machine during the switching process. In severe cases, the whole machine will shut down, which not only affects the use by the user, but also greatly reduces the reliability of the whole machine.

In response to the above-described problem, a compressor control method is provided in Embodiment 1 of the present disclosure. This control method is directly applied to various compressors. In specific implementations, it is possible to implement in such a manner that a corresponding program is written into the compressor or other device controllers. Specifically, FIG. 1 shows an alternative flowchart of this method. As shown in FIG. 1, the method comprises the following steps S202-S206.

In S202: a cylinder switching instruction is received, and operating parameters of the compressor are detected.

In S204: it is determined whether the cylinder switching operation is completed according to the operating parameters of the compressor.

In S206: torque compensation is performed after determining that the cylinder switching operation is completed.

In the above-mentioned embodiments, in order to solve the problem that the torque compensation of the compressor does not match the actually operating cylinder, a torque compensation method of a compressor is provided, which comprises: receiving a cylinder switching instruction and detecting operating parameters of a compressor; determining whether a cylinder switching operation is completed according to the operating parameters of the compressor; and performing torque compensation after determining that the cylinder switching operation is completed. In this method, variation of the cylinder is detected in real time after receiving the cylinder switching instruction, and a corresponding torque compensation program is added after the compressor switches the cylinder, thereby reducing the vibration caused by the problem that the torque compensation of the compressor does not match the actually operating cylinder when the cylinder is switched, and improving the reliability of the whole machine.

In some embodiments of the present disclosure, the method further comprises: detecting a current need for operating conditions before receiving the cylinder switching instruction, and determining whether the current need for operating conditions satisfies a cylinder switching condition; and generating the cylinder switching instruction when the current need for operating conditions satisfies the cylinder switching condition, wherein the cylinder switching instruction is configured to control action of a solenoid valve to perform the cylinder switching operation.

During operation of the air-conditioning unit, changes in the frequency of the fan and the compressor or various valve actions and operating conditions will affect the load change. During normal operation of the unit, its load varies slowly, typically in a second level. When the compressor switches the cylinder, there is a dramatic variation in the load before and after the cylinder is switched, which is embodied in the control of the compressor by instantaneous variation in power, voltage and current. Therefore, it is determined whether the compressor is completed switching the cylinder by detecting variation in power, voltage and current.

In some embodiments, the operating parameters of the compressor comprise at least one of the following: operating power of the compressor, operating voltage of the compressor, and operating current of the compressor.

The step of detecting operating power of the compressor comprises: detecting a current operating power $P1$ of the compressor when receiving the cylinder switching instruction; detecting a real-time operating power $P2$ of the compressor every first preset time interval. After the operating power of the compressor is detected, it is determined whether the cylinder switching operation is completed according to the detected operating power of the compressor. Specifically, there comprise the following steps: calculating a ratio of the real-time operating power $P2$ to the current operating power $P1$; comparing the ratio with a cylinder switching threshold; wherein the cylinder switching threshold is a preset value configured to represent that switching of the cylinder is completed; if the ratio is greater than or equal to the cylinder switching threshold, it is indicated that there is a great variation in the operating power of the compressor, which is caused by switching the cylinder. As a result, it is determined that the cylinder switching operation is completed.

The step of detecting operating voltage of the compressor comprises: detecting a current operating voltage $V1$ of the compressor when receiving the cylinder switching instruction; detecting a real-time operating voltage $V2$ of the compressor every first preset time interval. After the operating voltage of the compressor is detected, it is determined whether the cylinder switching operation is completed according to the detected operating voltage of the compressor. Specifically, there comprise the following steps: calculating a ratio of the real-time operating voltage $V2$ to the current operating voltage $V1$; comparing the ratio with a cylinder switching threshold; wherein the cylinder switching threshold is a preset value configured to represent that switching of the cylinder is completed; if the ratio is greater than or equal to the cylinder switching threshold, it is indicated that there is a great variation in the operating voltage of the compressor, which is caused by switching the cylinder. As a result, it is determined that the cylinder switching operation is completed.

The step of detecting operating current of the compressor comprises: detecting a current operating current of the compressor when receiving the cylinder switching instruction; detecting a real-time operating current of the compressor every first preset time interval. After the operating current of the compressor is detected, it is determined whether the cylinder switching operation is completed according to the detected operating current of the compressor. Specifically, there comprise the following steps: calculating a ratio of the real-time operating current to the current operating current; comparing the ratio with a cylinder switching threshold; wherein the cylinder switching threshold is a preset value configured to represent that switching of the cylinder is completed; if the ratio is greater than or equal to the cylinder switching threshold, it is indicated that there is a great variation in the operating current of the compressor, which is caused by switching the cylinder. As a result, it is determined that the cylinder switching operation is completed.

In other embodiments of the present disclosure, the method further comprises starting a timer to start timing after detecting the current operating parameter of the compressor; and stopping timing and clearing the timer after determining that the cylinder switching operation is completed. The method further comprises: detecting timing time after starting the timer, and determining whether the timing time reaches a cylinder switching waiting time, wherein the cylinder switching waiting time is a preset longest waiting time; and prompting that the cylinder switching operation fails and the solenoid valve or the compressor is malfunctioned when the timing time reaches the cylinder switching waiting time. The timer is used to detect the time for operation of switching the cylinder. If the switch is not successful for a long time, the user is prompted that failure of the cylinder switching is caused by malfunction of the solenoid valve or compressor. If the cylinder switching is completed, the timer will be cleared for next use.

Figure 3:
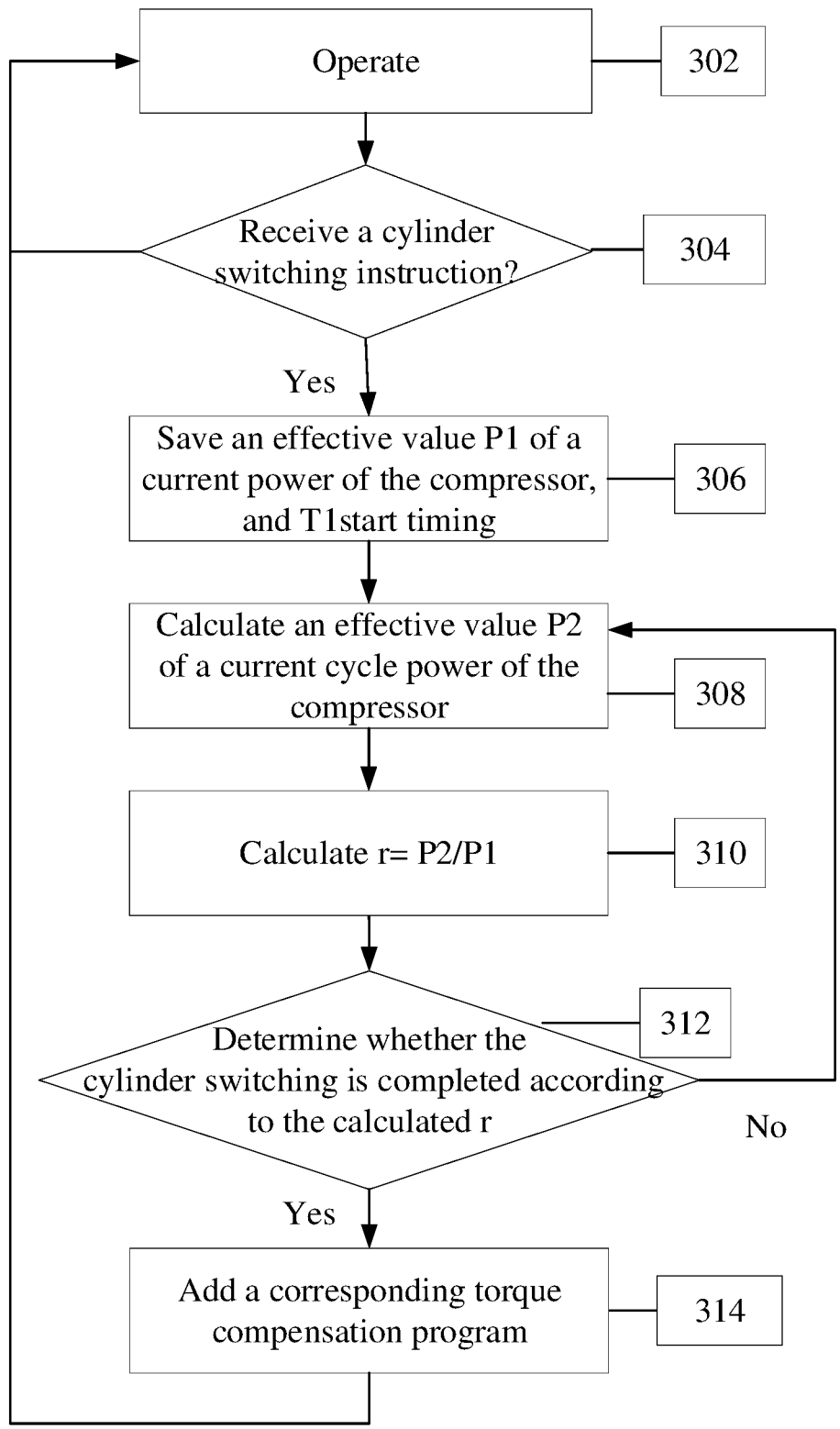
FIG. 3 is another alternative flowchart of the compressor control method according to Embodiment 1 of the present disclosure.

In Embodiment 1 of the present disclosure, another compressor control method is also provided. FIG. 3 shows an alternative flowchart of this method. As shown in FIG. 3, the method comprises the following steps S302-S314.

In S302: the compressor is operated.

In S304: it is determined whether a cylinder switching instruction is received; when a cylinder switching instruction is received, proceed to step S306; otherwise, proceed to step S302.

In S306: an effective value P1 of a current power of the compressor is saved, and timer T1 starts timing.

In S308: an effective value P2 of a current cycle power of the compressor is calculated.

In S310: a ratio of power r=P2/P1 is calculated.

In S312: it is determined whether the cylinder switching is completed according to the calculated r; if it is determined that the cylinder switching is completed, proceed to step S314; otherwise, return to step S308.

In S314: a corresponding torque compensation program is added; afterwards, return to step S302.

In the present disclosure, the operating voltage and operating current of the compressor are also used to determine whether the cylinder switching is completed.

The master controller determines a current need for operating conditions, controls action of a corresponding solenoid valve and sends a cylinder switching instruction to the drive controller if the cylinder switching condition is reached.

After the drive controller receives the cylinder switching instruction, an effective value P1 of a current operating power of the compressor is immediately saved, and the timer T1 is started at the same time. Afterwards, an effective value P2 of a cycle power of the compressor is detected in real time, and a ratio therebetween is calculated: r=P2/P1. If the ratio r reaches a set value, it is determined that the cylinder switching is completed successfully, and a corresponding torque compensation program is added immediately.

The ratio r is determined experimentally according to the compressor in actual use, because the variable capacity compressor used is different, and the power change after the cylinder is switched is different.

After the cylinder switching instruction is received, the timer T1 remains counting and clears until a successful cylinder switching is determined. Otherwise, when the timer $T1=T_{pro}$, it is determined that action of the solenoid valve has not been actually performed all the time or action of the solenoid valve is performed but the cylinder is not switched for some reason. At this time, it is necessary to report a fault that the cylinder switching fails, and check whether the solenoid valve and the compressor are damaged, wherein $T_{pro}$ is a maximum waiting time for allowing the cylinder switching.

In the above-mentioned embodiments, in order to solve the problem that the torque compensation of the compressor does not match the actually operating cylinder, a torque compensation method of a compressor is provided, which comprises: receiving a cylinder switching instruction and detecting operating parameters of a compressor; determining whether a cylinder switching operation is completed according to the operating parameters of the compressor; and performing torque compensation after determining that the cylinder switching operation is completed. In this method, variation of the cylinder is detected in real time after receiving the cylinder switching instruction, and a corresponding torque compensation program is added after the compressor switches the cylinder, thereby reducing the vibration caused by the problem that the torque compensation of the compressor does not match the actually operating cylinder when the cylinder is switched, and improving the reliability of the whole machine.

Embodiment 2

Figure 4:
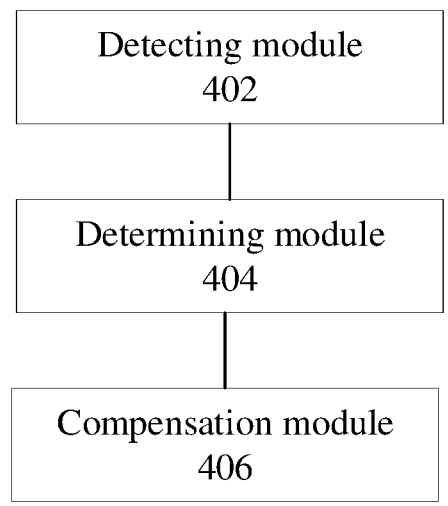
FIG. 4 is an alternative structural block view of the compressor control apparatus according to Embodiment 2 of the present disclosure.

Based on the compressor control method provided in the above-described Embodiment 1, a compressor control apparatus is also provided in the Embodiment 2 of the present disclosure. Specifically, FIG. 4 shows an alternative structural block view of this apparatus. As shown in FIG. 4, the apparatus comprises:

a detecting module 402, configured to receive a cylinder switching instruction and detect operating parameters of the compressor;

a determining module 404, connected to the detecting module 402, and configured to determine whether a cylinder switching operation is completed according to the operating parameters of the compressor; and a compensation module 406, connected to the determining module 404, and configured to perform torque compensation after determining that the cylinder switching operation is completed.

In the above-mentioned embodiments, in order to solve the problem that the torque compensation of the compressor does not match the actually operating cylinder, a torque compensation apparatus of a compressor is provided, which comprises: receiving a cylinder switching instruction and detecting operating parameters of a compressor; determining whether a cylinder switching operation is completed according to the operating parameters of the compressor; and performing torque compensation after determining that the cylinder switching operation is completed. In this method, variation of the cylinder is detected in real time after receiving the cylinder switching instruction, and a corresponding torque compensation program is added after the compressor switches the cylinder, thereby reducing the vibration caused by the problem that the torque compensation of the compressor does not match the actually operating cylinder when the cylinder is switched, and improving the reliability of the whole machine.

Figure 6:
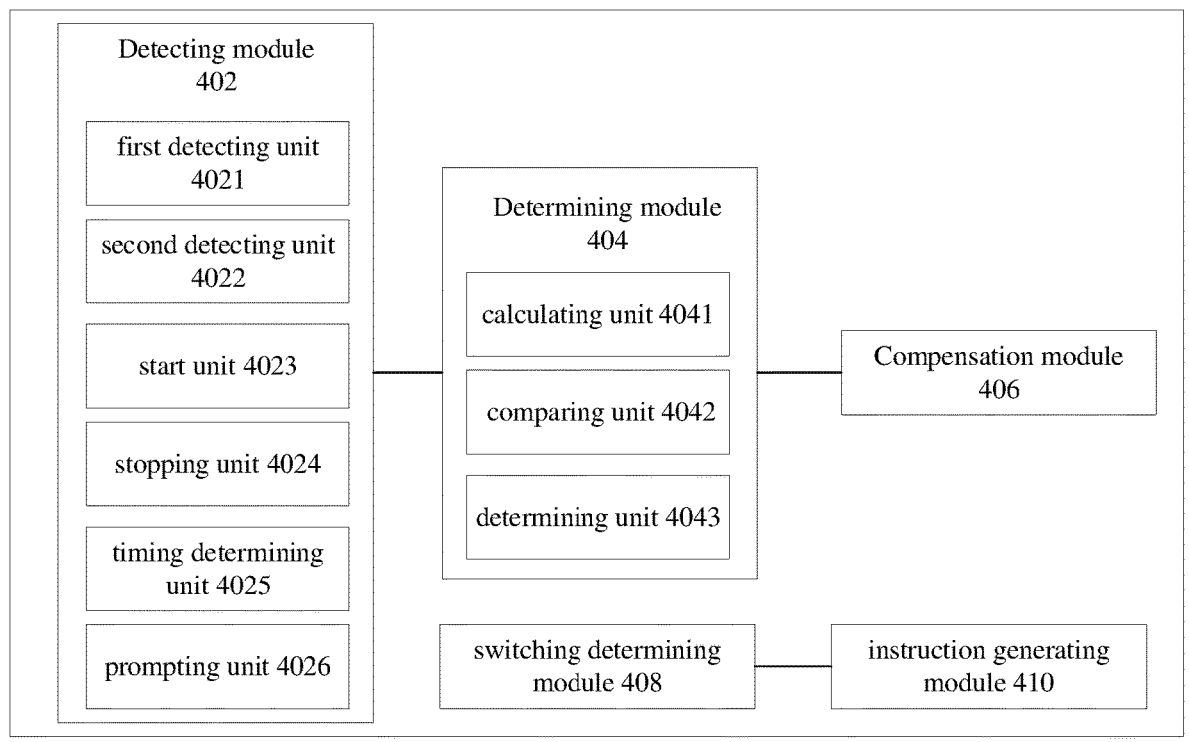
FIG. 6 is another alternative structural block view of the compressor control apparatus according to Embodiment 2 of the present disclosure.

In some embodiments of the present disclosure, as shown in FIG. 6, the apparatus further comprises: a switching determining module 408 configured to a current need for operating conditions before receiving the cylinder switching instruction, and determine whether the current need for operating conditions satisfies a cylinder switching condition; and an instruction generating module 410 configured to generate the cylinder switching instruction when the current need for operating conditions satisfies the cylinder switching condition, wherein the cylinder switching instruction is configured to control action of a solenoid valve to perform the cylinder switching operation.

In the above-described embodiments, as shown in FIG. 6, the detecting module 402 comprises: a first detecting unit 4021 configured to detect a current operating parameter of the compressor when receiving the cylinder switching instruction; and a second detecting unit 4022 configured to detect a real-time operating parameter of the compressor every first preset time interval; the determining module 404 comprises: a calculating unit 4041 configured to calculate a ratio of the real-time operating parameter to the current operating parameter; a comparing unit 4042 configured to compare the ratio with a cylinder switching threshold, wherein the cylinder switching threshold is a preset value configured to represent that the cylinder switching is completed; and a determining unit 4043 configured to determine that the cylinder switching operation is completed when the ratio is greater than or equal to the cylinder switching threshold. The operating parameters of the compressor comprise at least one of operating power of the compressor, operating voltage of the compressor, or operating current of the compressor.

In some embodiments, the detecting module 402 further comprises: a start unit 4023 configured to start a timer to start timing after detecting the current operating parameter of the compressor; and a stopping unit 4024 configured to stop timing and clear the timer after determining that the cylinder switching operation is completed.

Further, the detecting module 402 further comprises: a timing determining unit 4025 configured to detect timing time after the timer is started and determine whether the timing time reaches a cylinder switching waiting time, wherein the cylinder switching waiting time is a preset longest waiting time; a prompting unit 4026 configured to prompt failure of the cylinder switching operation and prompt malfunction of the solenoid valve or compressor when the timing time reaches the cylinder switching waiting time.

Regarding the apparatus in the above-described embodiments, the specific manner of performing an operation by each unit and module therein has been described in detail in the embodiments concerning this method, and thus will not be elaborated in detail here.

Embodiment 3

Figure 5:
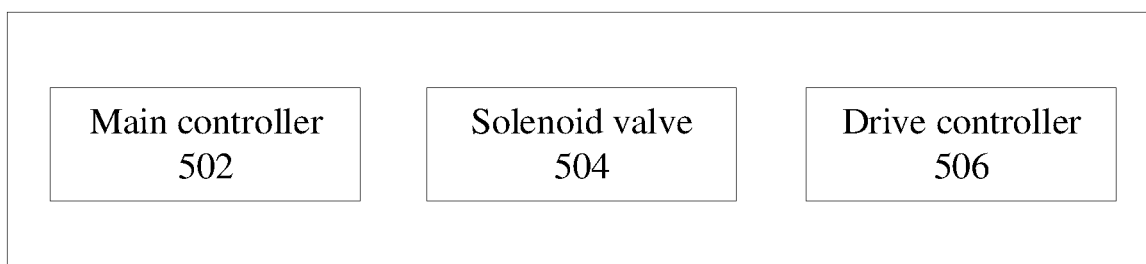
FIG. 5 is an alternative structural block view of the compressor control system according to Embodiment 3 of the present disclosure.

Based on the compressor control apparatus provided in Embodiment 2 described above, a compressor control system is also provided in Embodiment 3 of the present disclosure. Specifically, FIG. 5 shows an alternative structural block view of the system. As shown in FIG. 5, the system comprises: a main controller 502, a solenoid valve 504, and a drive controller 506.

The master controller 502 is configured to send a cylinder switching instruction to the solenoid valve 504 and the drive controller 506.

The solenoid valve 504 is configured to perform a cylinder switching operation after receiving the cylinder switching instruction.

The drive controller 506 is configured to detect operating parameters of the compressor after receiving the cylinder switching instruction, and determine whether the cylinder switching operation is completed according to the operating parameters of the compressor, and perform torque compensation after determining that the cylinder switching operation is completed.

In the above-mentioned embodiments, in order to solve the problem that the torque compensation of the compressor does not match the actually operating cylinder, a torque compensation method of a compressor is provided, which comprises: receiving a cylinder switching instruction and detecting operating parameters of a compressor; determining whether a cylinder switching operation is completed according to the operating parameters of the compressor; and performing torque compensation after determining that the cylinder switching operation is completed. In this method, variation of the cylinder is detected in real time after receiving the cylinder switching instruction, and a corresponding torque compensation program is added after the compressor switches the cylinder, thereby reducing the vibration caused by the problem that the torque compensation of the compressor does not match the actually operating cylinder when the cylinder is switched, and improving the reliability of the whole machine.

Further, the master controller determines whether a current need for operating conditions satisfies a cylinder switching condition by detecting the current need for operating conditions, and send the cylinder switching instruction to the solenoid valve and the drive controller when the current need for operating conditions satisfies the cylinder switching condition.

Further, the operating parameters of the compressor detected by the drive controller comprise at least one of the following: operating power of the compressor, operating voltage of the compressor, and operating current of the compressor.

In some embodiments, the drive controller loads a torque compensation program and executes the torque compensation program to perform torque compensation.

In some embodiments of the present disclosure, the system further comprises: a timer, configured to start timing after receiving the cylinder switching instruction, and stop timing and clear after determining that the cylinder switching operation is completed.

Further, the master controller is also configured to: detect the timing time after the timer starts timing and determine whether the timing time reaches a cylinder switching waiting time, wherein the cylinder switching waiting time is a preset longest waiting time.

In other embodiments of the present disclosure, the system further comprises: an alarm, configured to prompt that the cylinder switching operation fails and prompt the solenoid valve or the compressor is malfunctioned when the timing time reaches the cylinder switching waiting time.

Those skilled in the art will readily contemplate other implementation solutions of the present disclosure after considering the specification and practicing the application disclosed here. The present disclosure is intended to cover any variation, use, or adaptive change of the present disclosure, which follows general principles of the present disclosure and comprises common knowledge or conventional technical means in the art that is not filed in the present disclosure. The specification and embodiments are merely considered as exemplary, and actual scope and spirit of the present disclosure is as set forth by the claims below.

It should be understood that, the present disclosure is not limited to an accurate structure that has been described above and illustrated in the accompanying drawings, and various modifications and changes may be made without departing from the scope thereof. The scope of the present disclosure is only limited by the appended claims.

What is claimed is:

1. A compressor control method, comprising:
   receiving a cylinder switching instruction and detecting a plurality of operating parameters of a compressor;
   determining whether a cylinder switching operation is completed according to the plurality of operating parameters of the compressor; and
   performing torque compensation after determining that the cylinder switching operation is completed,
   wherein detecting the plurality of operating parameters of the compressor comprises:
   detecting a current operating parameter of the compressor when receiving the cylinder switching instruction; and
   detecting a real-time operating parameter of the compressor every first preset time interval,
   wherein determining whether the cylinder switching operation is completed according to the plurality of operating parameters of the compressor comprises:
   calculating a ratio of the real-time operating parameter to the current operating parameter;
   comparing the ratio with a cylinder switching threshold, wherein the cylinder switching threshold is a preset value configured to represent that the cylinder switching is completed; and
   determining that the cylinder switching operation is completed when the ratio is greater than or equal to the cylinder switching threshold.

2. The compressor control method according to claim 1, further comprising:
   detecting a current need for a plurality of operating conditions before receiving the cylinder switching instruction, and determining whether the current need for the plurality of operating conditions satisfies a cylinder switching condition; and
   generating the cylinder switching instruction when the current need for the plurality of operating conditions satisfies the cylinder switching condition, wherein the cylinder switching instruction is configured to control an action of a solenoid valve to perform the cylinder switching operation.

3. The compressor control method according to claim 1, further comprising:
   starting a timer after detecting the current operating parameter of the compressor; and
   stopping the timer and clearing the timer after determining that the cylinder switching operation is completed.

4. The compressor control method according to claim 3, further comprising:
   detecting a timing time after starting the timer, and determining whether the timing time reaches a cylinder switching waiting time, wherein the cylinder switching waiting time is a preset longest waiting time; and
   prompting, with an alarm, that the cylinder switching operation has failed and the solenoid valve or the compressor has malfunctioned when the timing time reaches the cylinder switching waiting time.

5. The compressor control method according to claim 1, wherein the plurality of operating parameters of the compressor comprise at least one of an operating power of the compressor, an operating voltage of the compressor, or an operating current of the compressor.

6. A compressor control apparatus, comprising:
   a detecting module configured to receive a cylinder switching instruction and detect a plurality of operating parameters of a compressor;
   a determining module configured to determine whether a cylinder switching operation is completed according to the plurality of operating parameters of the compressor; and
   a compensation module configured to perform torque compensation after determining that the cylinder switching operation is completed,
   wherein the detecting module comprises:
   a first detecting unit configured to detect a current operating parameter of the compressor when receiving the cylinder switching instruction; and
   a second detecting unit configured to detect a real-time operating parameter of the compressor every first preset time interval;
   the determining module comprises:
   a calculating unit configured to calculate a ratio of the real-time operating parameter to the current operating parameter;
   a comparing unit configured to compare the ratio with a cylinder switching threshold, wherein the cylinder switching threshold is a preset value configured to represent that the cylinder switching is completed; and
   a determining unit configured to determine that the cylinder switching operation is completed when the ratio is greater than or equal to the cylinder switching threshold.

7. The compressor control apparatus according to claim 6, further comprising:
   a switching module configured to determine a current need for a plurality of operating conditions before receiving the cylinder switching instruction, and to determine whether the current need for the plurality of operating conditions satisfies a cylinder switching condition; and
   an instruction generating module configured to generate the cylinder switching instruction when the current need for the plurality of operating conditions satisfies the cylinder switching condition, wherein the cylinder switching instruction is configured to control an action of a solenoid valve to perform the cylinder switching operation.

8. The compressor control apparatus according to claim 6, wherein the plurality of operating parameters of the compressor comprise at least one of an operating power of the compressor, an operating voltage of the compressor, or an operating current of the compressor.

9. A compressor control system, comprising:
   a drive controller configured to detect the plurality of operating parameters of a compressor after receiving a cylinder switching instruction, determine whether a cylinder switching operation is completed according to the operating parameters of the compressor, and perform torque compensation after determining that the cylinder switching operation is completed, wherein the drive controller configured to detect the plurality of operating parameters of a compressor comprising:
  detecting a current operating parameter of the compressor when receiving the cylinder switching instruction; and
  detecting a real-time operating parameter of the compressor every first preset time interval,
wherein the drive controller configured to determine whether the cylinder switching operation is completed according to the plurality of operating parameters of the compressor comprising:
  calculating a ratio of the real-time operating parameter to the current operating parameter;
  comparing the ratio with a cylinder switching threshold, wherein the cylinder switching threshold is a preset value configured to represent that the cylinder switching is completed; and
  determining that the cylinder switching operation is completed when the ratio is greater than or equal to the cylinder switching threshold.

10. The compressor control system according to claim 9, further comprising:
  a solenoid valve configured to perform the cylinder switching operation after receiving the cylinder switching instruction; and
  a master controller configured to send the cylinder switching instruction to the solenoid valve and the drive controller.

11. The compressor control system according to claim 10, wherein the master controller is configured to determine whether a current need for the plurality of operating conditions satisfies a cylinder switching condition by detecting the current need for the plurality of operating conditions, and send the cylinder switching instruction to the solenoid valve and the drive controller when the current need for the plurality of operating conditions satisfies the cylinder switching condition.

12. The compressor control system according to claim 11, wherein the plurality of operating parameters of the compressor detected by the drive controller comprise at least one of an operating power of the compressor, an operating voltage of the compressor, or an operating current of the compressor.

13. The compressor control system according to claim 12, wherein the drive controller is configured to load a torque compensation program and execute the torque compensation program to perform torque compensation.

14. The compressor control system according to claim 11, further comprising:
  a timer configured to start timing after the solenoid valve receives the cylinder switching instruction and stop timing and clear after the drive controller determines that the cylinder switching operation is completed.

15. The compressor control system according to claim 14, wherein the master controller is further configured to detect a timing time after the timer starts timing, and determine whether the timing time reaches a cylinder switching waiting time, wherein the cylinder switching waiting time is a preset longest waiting time.

16. The compressor control system according to claim 15, further comprising:
  an alarm configured to prompt that the cylinder switching operation has failed and the solenoid valve or the compressor has malfunctioned when the timing time reaches the cylinder switching waiting time.

17. The compressor control system according to claim 9, wherein the drive controller is configured to:
  detect a current operating parameter of the compressor when receiving the cylinder switching instruction;
  detect a real-time operating parameter of the compressor every first preset time interval;
  calculate a ratio of the real-time operating parameter to the current operating parameter;
  compare the ratio with a cylinder switching threshold, wherein the cylinder switching threshold is a preset value configured to represent that the cylinder switching is completed; and
  determine that the cylinder switching operation is completed when the ratio is greater than or equal to the cylinder switching threshold.

* * * * *